July 21, 1931.  J. N. SMITH  1,815,079
ELECTROLYTIC CELL
Filed July 12, 1928  2 Sheets-Sheet 1

James Norman Smith,
Inventor,
By Lewis J. Doolittle,
Atty.

James Norman Smith, Inventor,
By Lewis J. Doolittle, Atty.

Patented July 21, 1931

1,815,079

UNITED STATES PATENT OFFICE

JAMES NORMAN SMITH, OF TORONTO, ONTARIO, CANADA, ASSIGNOR, BY MESNE ASSIGNMENTS, TO WESTINGHOUSE ELECTRIC & MANUFACTURING COMPANY, A CORPORATION OF PENNSYLVANIA

ELECTROLYTIC CELL

Application filed July 12, 1928. Serial No. 292,106.

This invention relates to improvements in certain structural features of electrolytic cells, more particularly to cells employed in the electrolysis of water, such as described in U. S. Patent No. 1,620,052 to William G. Allan, to which the features of construction forming the subject matter of the present invention may be applied.

The object of this invention is to provide means whereby inter-cell units may be readily interconnected to form a group of cells and a number of groups joined by connecting means of high electrical efficiency and which conserves the space occupied, which is an important consideration in devices of this nature.

One feature of my invention consists in providing the end walls of an electrolytic cell group with cooperating conducting terminals or engaging means to electrically connect groups of cells. A single unit cell may be provided with terminals on both of its walls.

An embodiment of my invention is illustrated in the accompanying drawings, in which Fig. 1 is a top view of a single cell unit provided with terminals as described;

Figure 1:
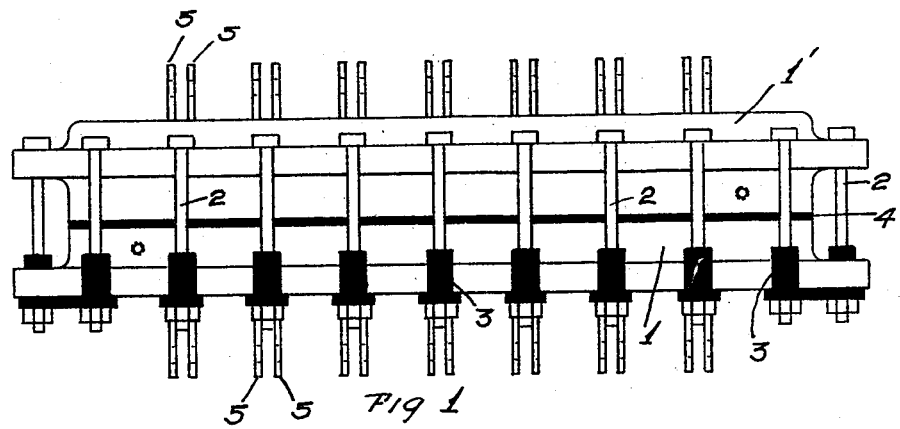

A single cell unit, such as illustrated in Fig. 1, comprises two half sections, indicated at 1 and 1'.

These half sections of the cell unit are of opposite polarity and are provided with flanges and joined together by suitable bolts, such as shown at 2, which are electrically insulated from one of the half sections, such as 1, by the insulating bushings 3. The half sections 1—1' are also insulated from each other by the insulating strip 4 interposed therebetween.

Figure 2:
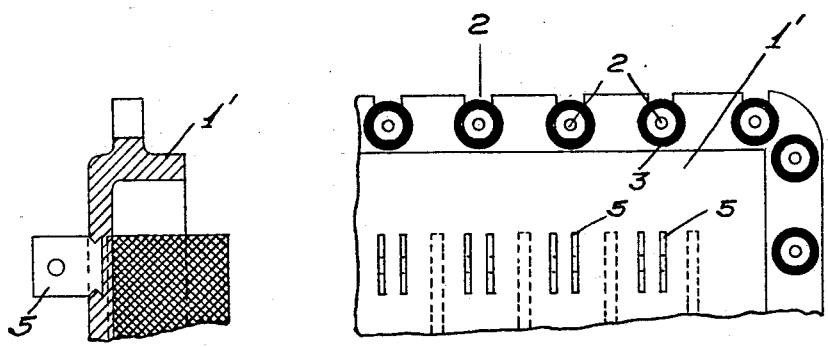
Fig. 2 is a part vertical cross-section, enlarged, of one half of cell shown in Fig. 1, the section being taken on the line 2—2 of Fig. 3.
Figure 3:
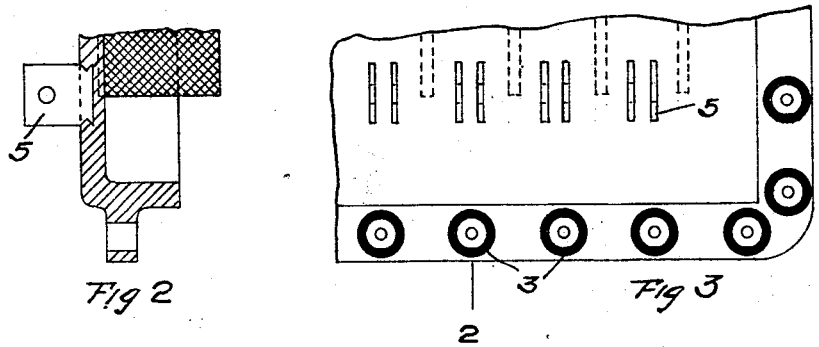
Fig. 3 is a part vertical end view of Fig. 1.

Terminals, indicated at 5—5, (Figs. 1–3) of any suitable conducting material and configuration, are positioned on and permanently secured to the end walls of the cell. According to my preferred construction, these terminals are arranged in pairs and each having one end permanently embedded in by casting the same into the end walls, as shown in Fig. 2, the projecting end of each terminal being formed with a large flat contact surface adapted to be brought into direct contact with corresponding terminals of an adjacent cell, in order to insure a good electrical connection of high efficiency and avoid loss of energy at this point.

Figure 5:
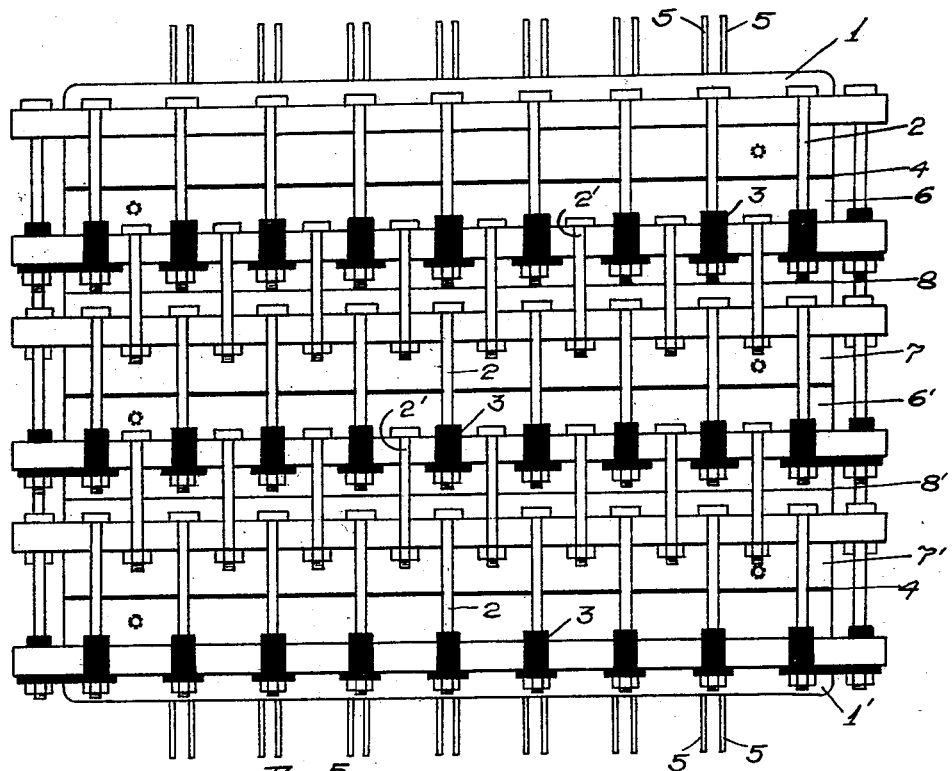
Fig. 5 is a top view of a group of three cells connected in the manner described hereinafter.
Figure 4:
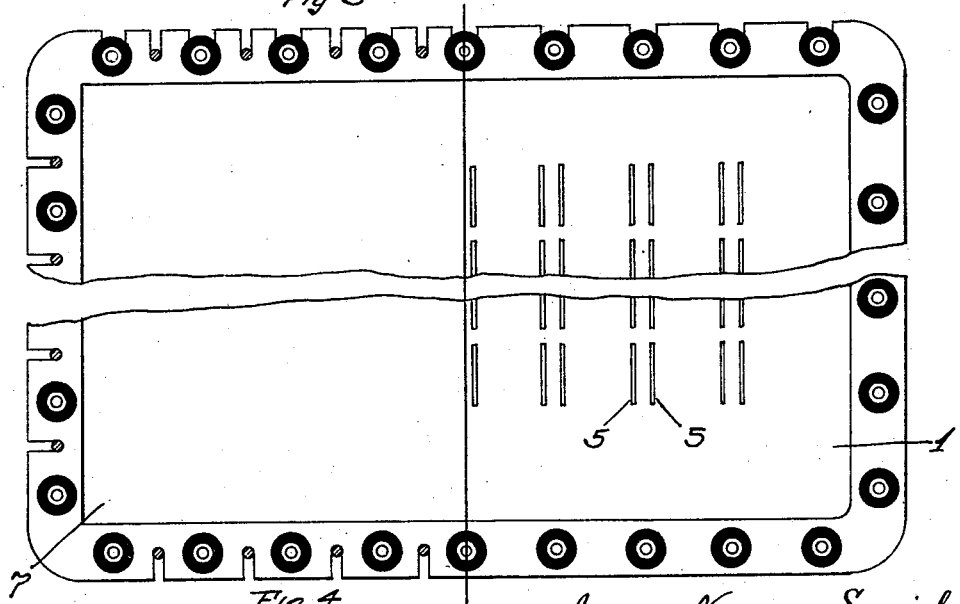
Fig. 4 is a part elevation and a part section of Fig. 5, showing, in the left half of the figure, the frame for joining the cells of a group, and in the right half of the figure the end cell terminals for joining adjacent cells.

When a group of cells is formed, such as illustrated in Figs. 4 and 5, only the outer cell walls of the end cells, 1 and 1', are provided with the terminals 5, above described. Intermediate cell units, such as 6 and 7, 6' and 7', have their adjacent wall faces pressed and held closely together by bolts, such as shown at 2' (Fig. 5), and in order to provide for current to pass from one cell unit to the other of these adjacent cell unit walls and avoid energy loss at this point, an efficient electrically conducting joint or connection is formed by interposing a thin sheet of soft copper, or other good conducting medium, between these adjacent faces, as shown at 8 and 8'.

It will be seen that the objects of the invention, as set out in the preamble to this specification, may be accomplished in a very efficient and simple manner by the features of construction of the cell units and associated parts herein described and shown as illustrative of one of the embodiments thereof.

Having described my invention, what I claim is:—

1. Means for connecting electrolytic cells, comprising conducting terminals each having one end embedded in and permanently secured to the end walls of said cells and their projecting ends being provided with a large contact surface providing means for and adapted to be electrically connected in direct contact with corresponding terminals of another cell or group of cells.

2. Means for connecting electrolytic cells, comprising conducting terminals arranged in pairs each having one end permanently embedded in by casting the same into the end wall, projecting from the end walls of said cells and formed with a large contact surface and adapted to be operatively connected electrically in direct contact with corresponding terminals of another cell or group of cells.

3. A group of electrolytic cells comprising a number of cell units arranged side by side and having interposed between the adjacent end wells a relatively soft conducting medium, means for pressing and holding adjacent end walls and said interposed conducting medium closely together to form with said interposed conducting medium a joint of relatively high conductivity and low resistance.

4. A group of electrolytic cells comprising a number of cell units arranged side by side and having interposed between the adjacent end walls a thin copper sheet, means for pressing and holding the adjacent end wall faces and copper sheet in close contact therewith together to form with said interposed copper sheet a joint of relatively high conductivity and low resistance.

5. A group of electrolytic cells comprising a number of cell units arranged side by side and having interposed between the adjacent end walls a thin copper sheet, means for pressing and holding said cells together, and terminals mounted on the outer walls of the end cells of the group adapted to co-operate and make electrical contact with similar terminals on another cell or group of cells.

Signed at Toronto, county of York, Province of Ontario, Canada, this 9th day of July, A. D. 1928.

JAMES NORMAN SMITH.